(12) United States Patent
Kakkar et al.

(10) Patent No.: US 9,172,658 B2
(45) Date of Patent: Oct. 27, 2015

(54) CALL SETUP SYSTEMS AND METHODS USING DYNAMIC LINK TAGGING AND OVERBOOKING OF LINKS IN MULTI-DOMAIN TRANSPORT NETWORKS

(71) Applicants: Vikas Kakkar, Hisar (IN); Kapil Juneja, Gurgaon (IN); Anurag Prakash, Noida (IN); Mohit Chhillar, Delhi (IN)

(72) Inventors: Vikas Kakkar, Hisar (IN); Kapil Juneja, Gurgaon (IN); Anurag Prakash, Noida (IN); Mohit Chhillar, Delhi (IN)

(73) Assignee: Ciena Corporation, Hanover, MD (US)

( * ) Notice: Subject to any disclaimer, the term of this patent is extended or adjusted under 35 U.S.C. 154(b) by 172 days.

(21) Appl. No.: 13/783,764

(22) Filed: Mar. 4, 2013

(65) Prior Publication Data

US 2014/0205278 A1      Jul. 24, 2014

(51) Int. Cl.
| H04B 10/032 | (2013.01) |
| H04L 12/911 | (2013.01) |
| H04L 12/715 | (2013.01) |
| H04L 12/913 | (2013.01) |

(52) U.S. Cl.
CPC .............. *H04L 47/728* (2013.01); *H04L 45/04* (2013.01); *H04L 47/724* (2013.01)

(58) Field of Classification Search
None
See application file for complete search history.

(56) References Cited

U.S. PATENT DOCUMENTS

| 6,904,462 | B1 | 6/2005 | Sinha |
| 7,092,356 | B2 | 8/2006 | Rabie et al. |
| 7,164,679 | B2 | 1/2007 | Kotha et al. |
| 7,212,551 | B1 * | 5/2007 | Beshai et ........................ 370/509 |
| 7,233,571 | B1 * | 6/2007 | Krishnamurthy et al. ..... 370/236 |
| 7,289,730 | B2 | 10/2007 | Matsuura et al. |
| 7,551,550 | B2 | 6/2009 | Sinha |
| 7,729,274 | B2 | 6/2010 | Arseneault et al. |
| 7,733,768 | B2 | 6/2010 | Attarwala et al. |
| 7,852,863 | B2 | 12/2010 | Madrahalli et al. |
| 8,045,481 | B2 | 10/2011 | Ong et al. |
| 8,045,551 | B2 | 10/2011 | Madrahalli et al. |
| 8,218,445 | B2 | 7/2012 | Katz et al. |
| 8,290,367 | B2 | 10/2012 | Reina et al. |
| 2003/0198227 | A1 * | 10/2003 | Matsuura et al. ........... 370/395.2 |
| 2004/0052207 | A1 * | 3/2004 | Charny et al. .................. 370/216 |
| 2008/0062876 | A1 | 3/2008 | Giroux et al. |
| 2008/0095176 | A1 * | 4/2008 | Ong et al. ...................... 370/400 |
| 2008/0298390 | A1 * | 12/2008 | Kneckt et al. ................. 370/468 |
| 2012/0014284 | A1 | 1/2012 | Ranganathan et al. |
| 2012/0106950 | A1 | 5/2012 | Madrahalli et al. |
| 2012/0134296 | A1 * | 5/2012 | Lin ................................ 370/254 |
| 2012/0269058 | A1 * | 10/2012 | Ramakrishnan et al. ..... 370/228 |

* cited by examiner

*Primary Examiner* — Steve Young

(74) *Attorney, Agent, or Firm* — Clements Bernard PLLC; Christopher L. Bernard; Lawrence A. Baratta, Jr.

(57) ABSTRACT

Call setup methods in a multi-domain network and a multi-domain network use dynamic link tagging and/or overbooking of External Network-Network Interface (ENNI) links. Thus, improved call setup systems and methods include two approaches to improve upon the responsiveness of the network for connection setups including bandwidth reservation in optical networks using "dynamic link tags" and link overbooking in optical networks based on a greedy approach. The bandwidth reservation and the link overbooking can be utilized together or separately to improve call setup. Advantageously, the improved call setup systems and methods can provide a generic bandwidth reservation mechanism, such as in Automatically Switched Optical Network (ASON) networks, to overcome the limitation of ENNI in concurrently updating the abstract link bandwidth and thereby improving the responsiveness of the network.

21 Claims, 10 Drawing Sheets

CALL SETUP SYSTEMS AND METHODS USING DYNAMIC LINK TAGGING AND OVERBOOKING OF LINKS IN MULTI-DOMAIN TRANSPORT NETWORKS

CROSS-REFERENCE TO RELATED APPLICATION

The present patent application/patent claims the benefit of priority of Indian Patent Application No. 152/DEL/2013, filed on Jan. 21, 2013, and entitled "IMPROVED CALL SETUP SYSTEMS AND METHODS USING DYNAMIC LINK TAGGING AND OVERBOOKING OF LINKS IN MULTI-DOMAIN TRANSPORT NETWORKS," the contents of which are incorporated in full by reference herein.

FIELD OF THE DISCLOSURE

The present disclosure relates generally to networking systems and methods. More particularly, the present disclosure relates to improved call setup systems and methods using dynamic link tagging and overbooking of links in multi-domain transport networks.

BACKGROUND OF THE DISCLOSURE

Optical (i.e., transport) networks and the like (e.g., wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control plane systems and methods provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections there between. Control plane systems and methods use bandwidth advertisements to notify peer nodes of available link capacity. The bandwidth advertisements exchange information over a dedicated and well known communication channel with peers on opposite ends of the communication link.

External Network-Network Interface (ENNI) is defined in OIF-E-NNI-Sig-02.0 (April 2009) "OIF E-NNI Signaling Specification," the contents of which are herein incorporated by reference. ENNI is used for multiple vendor networks/domains which do not share individual network topology there between. Abstract link information is flooded between various domains that do not carry enough resource information to allow path validation for inter-domain calls. Further the resource information on abstract links is not updated dynamically. Therefore path validation is not comprehensive for inter domain calls. This can lead to call setup on an invalid path and thus to crank-backs (i.e., failed connection setups) which cannot be avoided. Call-setup also takes a significantly higher time to establish/fail. During this, a particular ENNI link acts a bottleneck for the new connections. It allows connections of bandwidth equaling to its link bandwidth and rejects any new connections.

In ENNI networks, the bandwidth for inter-domain connections within a vendor cloud is defined by way of Abstract Links that are not updated dynamically or flooded across the cloud. Since this bandwidth is practically un-reserved and may be occupied by other connections (including internal network-network interface (I-NNI) connections), this may lead to gradual deviation of available bandwidth within a domain without the other domains coming to know, thereby causing transit/terminating calls to crank-back as they enter this domain. Also the number of concurrent in-progress call setups is limited to only the bandwidth available on the ENNI and unable to take advantage of the fact that few of the concurrent calls may fail eventually leading to spare bandwidth. This is accentuated by the delays involved in end-to-end connection establishment in multi-domain multi-hop ENNI networks. All of the above lead to high rate of crank-backs.

There is currently no bandwidth reservation capability in the networks for ENNI-connections on in control planes which does not involve explicit reservation. Also the current available bandwidth between a pair of ENNI endpoints (Abstract link bandwidth) is not updated dynamically to other Routing Controllers (RCs) in the network. Therefore, all the outside calls landing on a domain would have to crank-back if sufficient bandwidth is not available to establish them. At present, call setup in ENNI links can only support, for example, 32 simultaneous (in-progress or established) Optical channel Data Unit-0 (ODU0) calls on an Optical channel Transport Unit-3 (OTU3) ENNI Link. Suppose there are 32 ODU0 calls going on an OTU3 link and a RESV message has not been received back for any of the call. If the transient node gets $33^{rd}$ call on this link, this call will be rejected due to non-availability of the resources. But the resources are not yet involved in the call and there is a high chance of failure of the currently progressing calls. Thereby, it ends up losing the opportunity of any of the failed calls releasing bandwidth to setup this call.

Conventionally while checking for availability of resources on an outgoing ENNI link, a node blocks those resources so that other calls are not able to use them. This conventional approach has a drawback, e.g. assume that on outgoing link 32 timeslots are available. Now if the 32 calls are being setup simultaneously (assume each call consume one timeslot), thus timeslots start getting blocked. Let's say that at time t=0, a first call came in and t=10, a last 32nd call came in. Since all the resources get blocked, this transit node cannot handle any further call until some of the resources are freed. On a transit node, each call can have different starting and end point. Assume some of destination endpoints rejected the calls and the rejection message reached the transit node at, e.g., t=50. When this rejection message reached the transit node at t=50 this node unblocked some of the resources and can now take up further calls. So essentially between t=10 and t=50 all the resources get blocked for calls even if some of the calls became eventually unsuccessful.

Current approaches do not take into the account high chance of failure of calls in control plane networks, such as ASON. So it does not effectively utilize all the resources. A better approach is needed with respect to utilization of the resources available on ENNI links.

BRIEF SUMMARY OF THE DISCLOSURE

In an exemplary embodiment, a call setup method in a multi-domain network includes receiving, at a routing controller or a central server, an abstract link configuration request between two border nodes in a domain of the multi-domain network with a plurality of parameters associated therewith; determining a path for an abstract link in the domain based on the abstract link configuration request; generating a unique tag identifier for the determined path; flooding the determined path in the domain with the associated unique tag identifier; and creating the abstract link on the determined path such that the determined path is reserved based on the plurality of parameters.

In another exemplary embodiment, a call setup method in a multi-domain network includes operating an external network-network interface (ENNI) link connected to a border node in the multi-domain network in an overbooked manner; receiving a plurality of path requests over the ENNI link; determining bandwidth is not available for one or more of the plurality of path requests; for each of the one or more of the plurality of path requests, sending the path requests with blank upstream labels and new c-type (virtual time slot); and, upon receiving a reservation (RESV) message for each of the one or more of the plurality of path requests, checking again if bandwidth is available and if so, selecting the available bandwidth for the RESV message.

In yet another exemplary embodiment, a multi-domain network includes a plurality of domains each including a plurality of network elements interconnected therein; a first border node connecting two domains of the plurality of domains via an external network-network interface (ENNI) link; and a routing controller in one of the two domains; wherein the ENNI link is configured to operate in an overbooked manner for calls and wherein the routing controller is configured to dynamically reserve bandwidth in one of the plurality of domains via an abstract link with a dynamic tag associated therewith.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, improved call setup systems and methods using dynamic link tagging and overbooking of links in multi-domain transport networks are described. The improved call setup systems and methods include two approaches to improve upon the responsiveness of the network for connection setups. These include bandwidth reservation in optical networks using "dynamic link tags" and link overbooking in optical networks based on a greedy approach. The bandwidth reservation and the link overbooking can be utilized together or separately to improve call setup. Advantageously, the improved call setup systems and methods can provide a generic bandwidth reservation mechanism, such as in ASON-ENNI networks, to overcome the limitation of ENNI in concurrently updating the abstract link bandwidth and thereby improving the responsiveness of the network. Specifically, bandwidth can be reserved for work and protect routes for a demand-map, in the network providing better utilization of resources on ENNI links when a transit node is setting up multiple calls simultaneously. This leads to higher probability of calls being successful in event of multiple failures.

For bandwidth reservation in the Optical networks using "dynamic link tags", the improved call setup systems and methods use identifier tags to reserve bandwidth exclusively for a set of connections. This can generically be applied for carving out/reserving bandwidth within a domain. This illustrated herein as an application for bandwidth reservation in an ENNI multi-domain network setup. The demand map for bandwidth reservation is passed during Abstract Link creation on the central routing-controller (RC) node. For link overbooking in optical networks based on a greedy approach, the improved call setup systems and methods allow overbooking of the resources on ENNI network links until it has in-transit calls so that multiple simultaneous 'in-progress' calls can co-exist, exceeding the physical bandwidth. In this way, any time slots reserved for the failed calls can be released and assigned to the waiting overbooked calls which would have failed otherwise in the absence of any available resources. Herein, a method of overbooking in optical switching/transport networks based on a 'greedy' approach is described. After allocating all the resources available (e.g., time-slots, etc.), the improved call setup systems and methods allow overbooking of the existing resources in new calls. During overbooking, the improved call setup systems and methods send a blank upstream object in path message. So when any of the calls fail, the downstream node can select the resources which were just freed and send it in RESV message. Both the above methods can be applied independently or together and can be provided as a configuration option for an operator. The improved call setup systems and methods lead to better utilization of the resources available on ENNI links.

Figure 1:
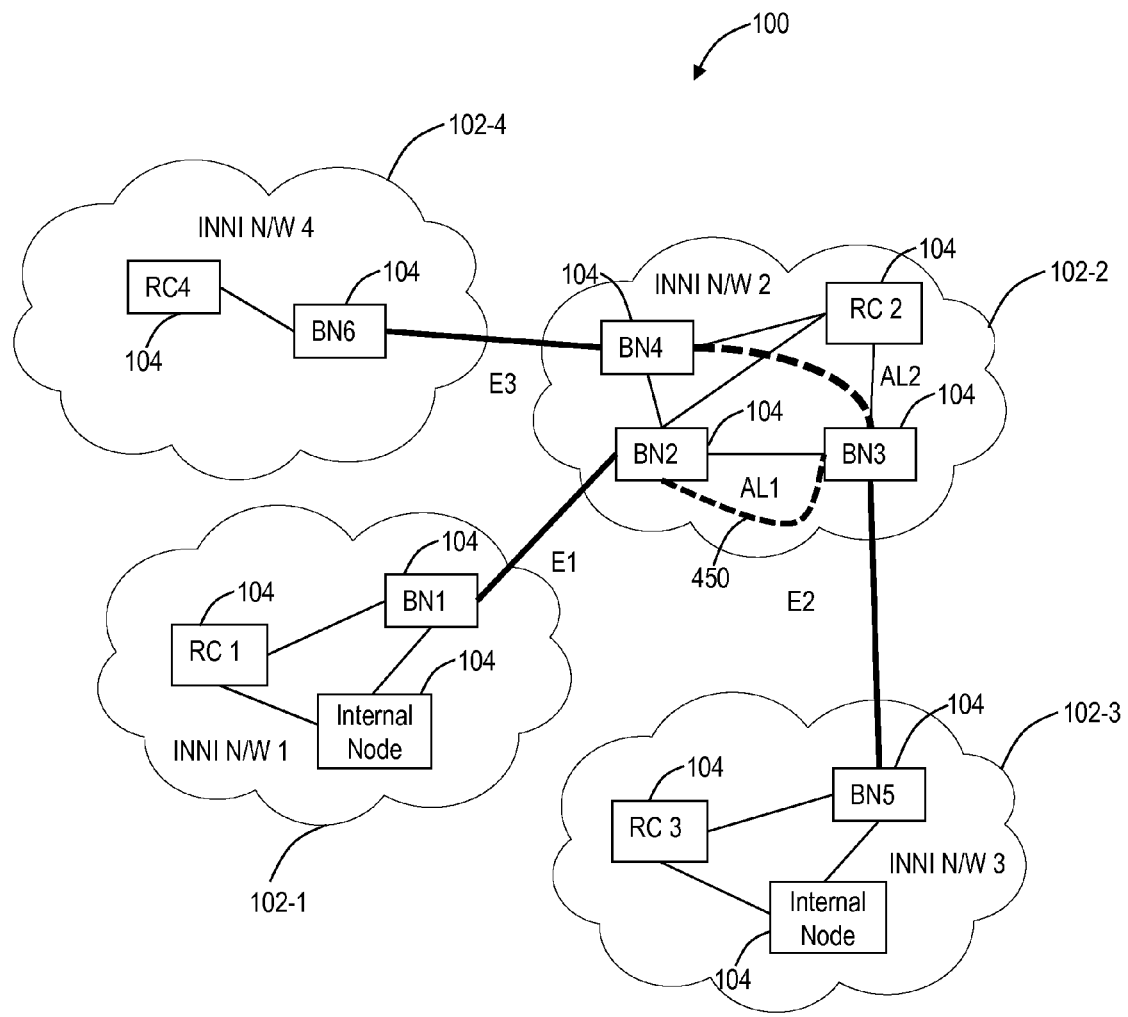
FIG. 1 is a network diagram of a network for illustration of the improved call setup systems and methods.

Referring to FIG. 1, in an exemplary embodiment, a network diagram illustrates a network 100 for illustration of the improved call setup systems and methods. The network 100 includes four domains 102-1, 102-2, 102-3, 102-4 each including various network elements 104. The network elements 104 are interconnected to one another and labeled based on exemplary functionality as one of a border node (BN1-BN6), a routing controller (RC1-RC4), and internal nodes. The border nodes BN1-BN6 are nodes that are communicatively coupled to other nodes in their internal domains 102-1, 102-2, 102-3, 102-4 as well as to nodes in other domains 102-1, 102-2, 102-3, 102-4 via ENNI links E1, E2, E3. For example, the border node BN1 connects to the routing controller RC1, an internal node in the domain 102-1, and the border node BN2 via the ENNI link E1. The internal nodes are nodes with links that connect to other nodes only with the domain 102-1, 102-2, 102-3, 102-4, i.e. nodes with all links being internal to the domain 102-1, 102-2, 102-3, 102-4. The routing controller RC1-RC4 is a node with a routing controller operating thereon or connected thereto. For example, the routing controller functionality can be implemented within of the network elements 104 or via a server or the like communicatively coupled to the network element 104. For example, the routing controller is defined in part in G.8080 and can respond to requests for path (route) information needed to set up connections as well as requests for topology information for network management purposes.

Figure 2:
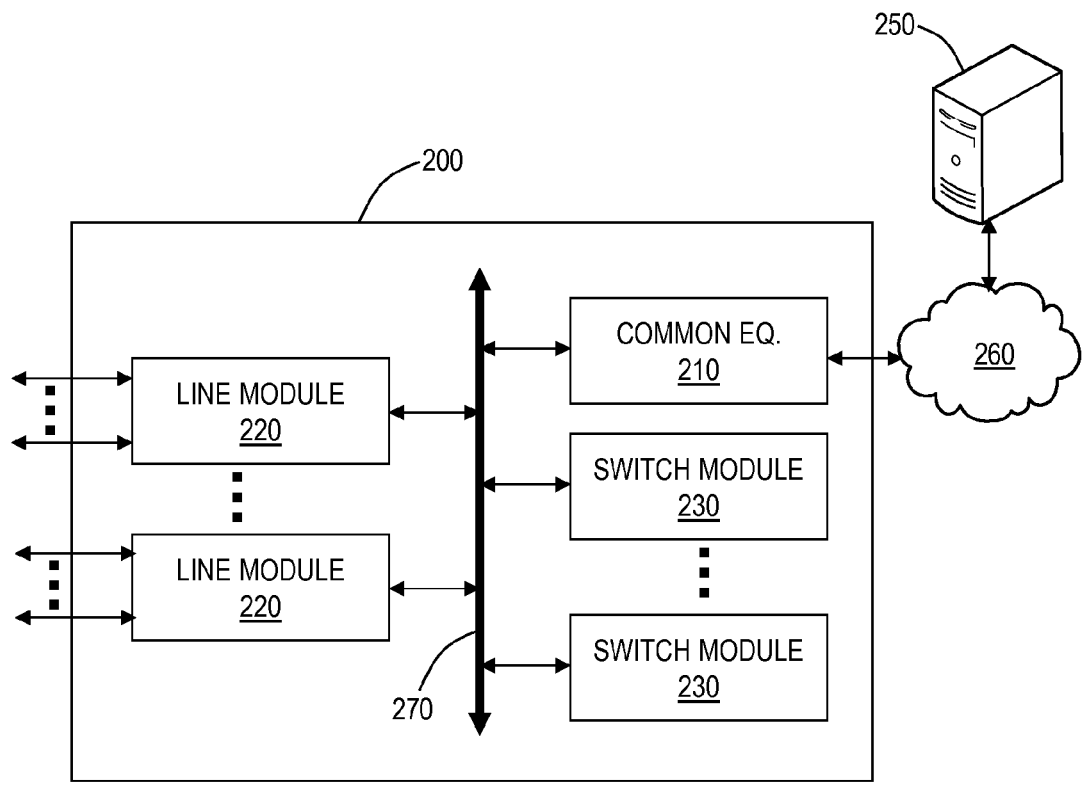
FIG. 2 is a block diagram of an exemplary network element for the improved call setup systems and methods.

Referring to FIG. 2, in an exemplary embodiment, a block diagram illustrates an exemplary network element 104 for the improved call setup systems and methods. In an exemplary embodiment, the exemplary network element 104 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 104 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the network element 104 can be any digital system with ingress and egress digital signals and switching therebetween of channels, timeslots, tributary units, etc. utilizing OTN, SONET, SDH, etc. While the network element 104 is generally shown as an optical network element, the improved call setup systems and methods are contemplated for use with any switching fabric, network element, or network based thereon.

In an exemplary embodiment, the network element 104 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260. The management system 250 can include a network management system (NMS), element management system (EMS), or the like. Additionally, the common equipment 210 can include a control plane processor configured to operate a control plane as described herein. The network element 104 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and external to the network element 104. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the network element 104, and each line module 220 can include one or more physical ports. For example, the line modules 220 can form the links 104, 204 described herein. The switch modules 230 are configured to switch channels, timeslots, tributary units, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include both Time Division Multiplexed (TDM) (i.e., circuit switching) and packet switching engines. The switch modules 230 can include redundancy as well, such as 1:1, 1:N, etc. In an exemplary embodiment, the switch modules 230 provide OTN, SONET, or SDH switching.

Those of ordinary skill in the art will recognize the network element 104 can include other components which are omitted for illustration purposes, and that the systems and methods described herein are contemplated for use with a plurality of different network elements with the network element 104 presented as an exemplary type of network element. For example, in another exemplary embodiment, the network element 104 may not include the switch modules 230, but rather have the corresponding functionality in the line modules 220 (or some equivalent) in a distributed fashion. For the network element 104, other architectures providing ingress, egress, and switching therebetween are also contemplated for the systems and methods described herein. In general, the systems and methods described herein contemplate use with any network element providing switching of OTN, SONET, SDH, etc. channels, timeslots, tributary units, wavelengths, etc.

Figure 3:
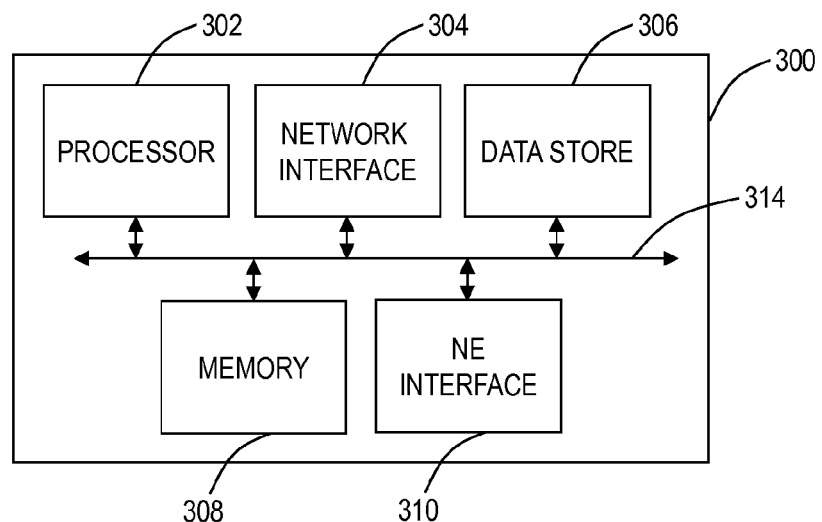
FIG. 3 is a block diagram of a controller to provide control plane processing and/or operations, administration, maintenance, and provisioning (OAM&P)

Referring to FIG. 3, in an exemplary embodiment, a block diagram illustrates a controller 300 to provide control plane processing and/or operations, administration, maintenance, and provisioning (OAM&P) for a node such as the network element 104. The controller 300 can be part of common equipment, such as common equipment 210 in the network element 104. The controller 300 can include a processor 302 which is hardware device for executing software instructions such as operating the control plane. The processor 302 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 302 is configured to execute software stored within memory, to communicate data to and from the memory, and to generally control operations of the controller 300 pursuant to the software instructions. The controller 300 can also include a network interface 304, a data store 306, memory 308, a network element interface 310, and the like, all of which are communicatively coupled therebetween and with the processor 302.

The network interface 304 can be used to enable the controller 300 to communicate on a network, such as to communicate control plane information to other controllers, to the management system 260, and the like. The network interface 304 can include, for example, an Ethernet card (e.g., 10 BaseT, Fast Ethernet, Gigabit Ethernet) or a wireless local area network (WLAN) card (e.g., 802.11a/b/g). The network interface 304 can include address, control, and/or data connections to enable appropriate communications on the network. The data store 306 can be used to store data, such as control plane information, provisioning data, OAM&P data, etc. The data store 306 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 306 can incorporate electronic, magnetic, optical, and/or other types of storage media. The memory 308 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 308 may incorporate electronic, magnetic, optical, and/or other types of storage media. Note that the memory 308 can have a distributed architecture, where various components are situated remotely from one another, but may be accessed by the processor 302.

The network element interface 310 includes components for the controller 300 to communicate to other devices in a node, such as through the local interface 270. The components (302, 304, 306, 308, 310) are communicatively coupled via a local interface 314. The local interface 314 and the network element interface 310 can be, for example but not limited to, one or more buses or other wired or wireless connections, as is known in the art. The local interface 314 and the network element interface 310 can have additional elements, which are omitted for simplicity, such as controllers, buffers (caches), drivers, repeaters, and receivers, among many others, to enable communications. Further, the local interface 314 and the network element interface 310 can include address, control, and/or data connections to enable appropriate communications among the aforementioned components.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Figure 4:
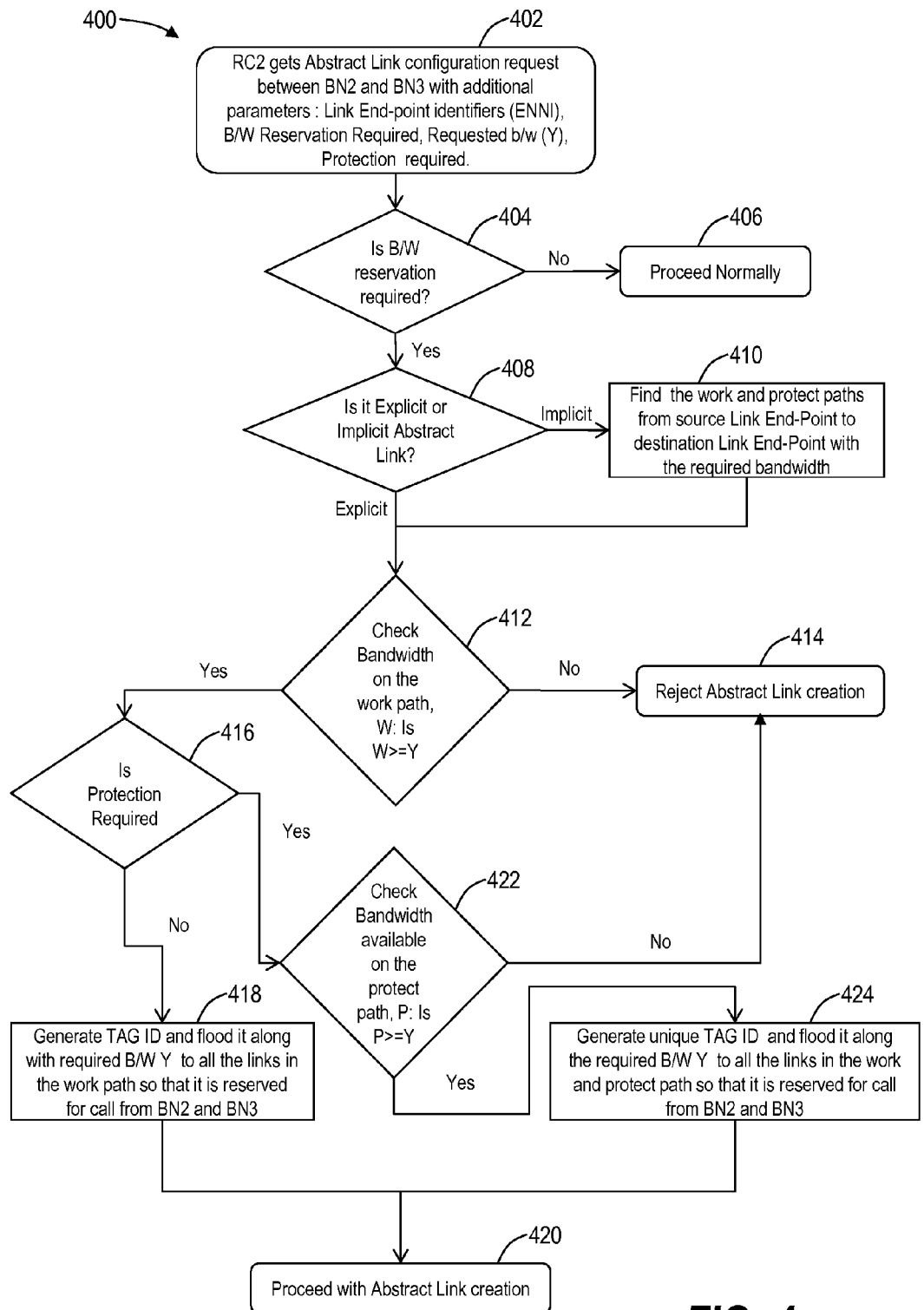
FIG. 4 is a flowchart of a bandwidth reservation process which references the network of FIG. 1 for illustration thereof.

Referring to FIG. 4, in an exemplary embodiment, a flowchart illustrates a bandwidth reservation process 400 which references the network 100 for illustration thereof. Bandwidth reservation is triggered at the time of abstract link creation with the demand map being passed, and includes the following additional information: Source and Destination Link endpoint identifiers, whether bandwidth reservation is required, a requested bandwidth amount (e.g., 2 X ODU3, 16 X ODU0, etc.), and whether protection is required. It can also be based on whether the abstract link is explicit (i.e., Designated Transit Lists (DTLs) specified) or implicit. The bandwidth reservation process 400 utilizes a tag identifier at a central server such as the routing controller. For illustration purposes, the bandwidth reservation process 400 assumes an abstract link creation between border nodes BN2, BN3. First, the RC2 gets an Abstract Link configuration request between BN2 and BN3 with additional parameters: Link End-point identifiers (e.g., Transport Network Addresses or TNAs), Bandwidth Reservation Required, Requested bandwidth (Y), Protection required (step 402). If bandwidth reservation is not required (step 404), the bandwidth reservation process 400 proceeds normally (step 406).

If bandwidth reservation is required (step 404) and if the abstract link is implicit (step 408), the bandwidth reservation process 400 finds the work and protect paths from source ENNI link to destination ENNI link with the required bandwidth (step 410). If bandwidth reservation is required (step 404) and if the abstract link is explicit (step 408) or after finding the work and protect paths (step 410), the bandwidth reservation process 400 checks the bandwidth on the work path (step 412), i.e. is work path bandwidth, W, greater than or equal to the requested bandwidth, Y. If W is less than Y (step 412), the bandwidth reservation process 400 rejects the abstract link creation (step 414). If W is greater than or equal to Y (step 412), the bandwidth reservation process 400 checks if protection is required (step 416). If protection is not required (step 416), then the bandwidth reservation process 400 generates a TAG ID and floods it along with required bandwidth Y to all the links in the work path so that it is reserved for a call from BN2 and BN3 (step 418) and the bandwidth reservation process 400 proceeds with abstract link creation (step 420).

If protection is required (step 416), the bandwidth reservation process 400 checks if bandwidth is available on the protect path (step 422), i.e. is protect path bandwidth, P, greater than or equal to Y. If P is less than Y, then the bandwidth reservation process 400 rejects the abstract link creation (step 414). If P is greater than or equal to Y, the bandwidth reservation process 400 generates a unique TAG ID and floods it along the required bandwidth Y to all the links in the work and protect path so that it is reserved for call from BN2 and BN3 (step 424) and the bandwidth reservation process 400 proceeds with abstract link creation (step 420). Accordingly, an abstract link (AU) 450 has now been established in the domain 102-2 between the border nodes BN2, BN3.

Figure 5:
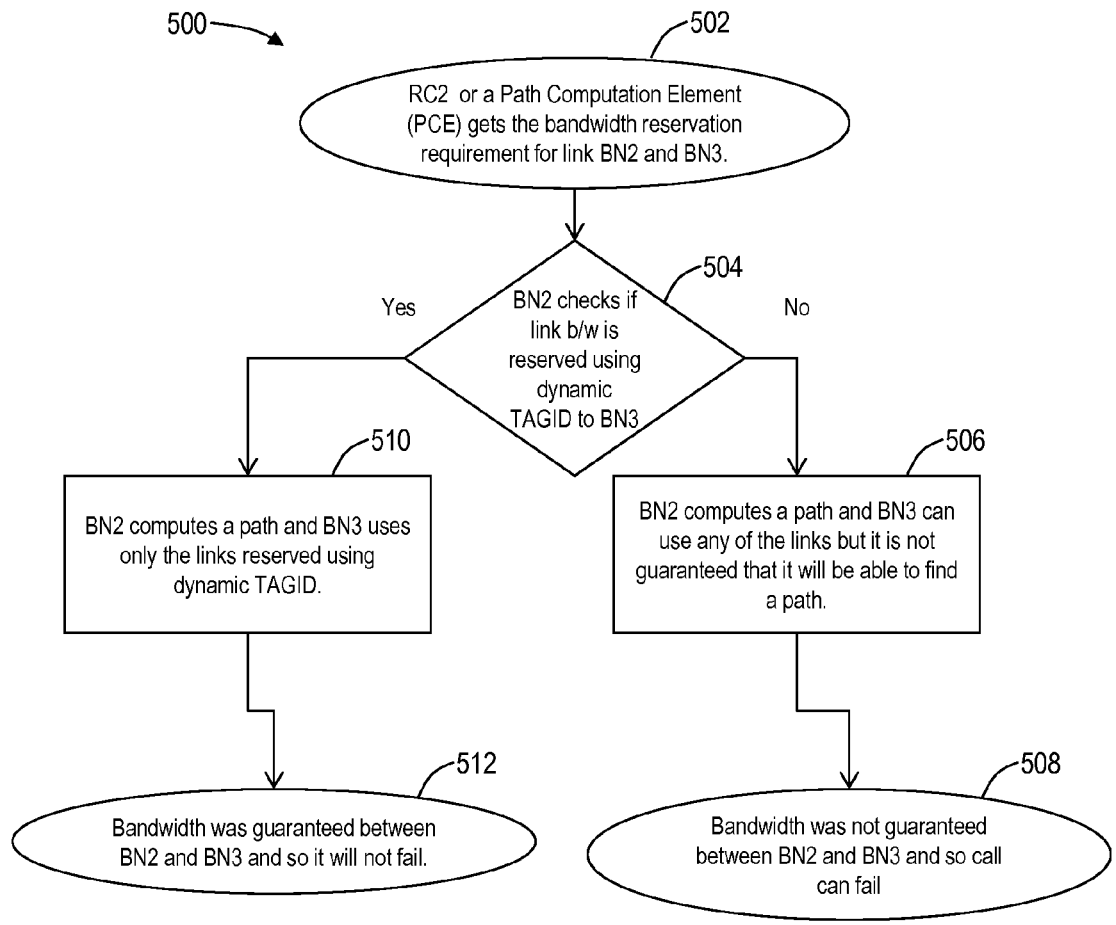
FIG. 5 is a flowchart of a call flow and path computation process which continues from the bandwidth reservation process of FIG. 4 and references the network of FIG. 1 for illustration thereof.

Referring to FIG. 5, in an exemplary embodiment, a flowchart illustrates a call flow and path computation process 500 which continues from the bandwidth reservation process 400 and references the network 100 for illustration thereof. Specifically, the call flow and path computation process 500 illustrates a call and path computation from the domain 102-1 to the domain 102-3 via the domain 102-2. With the abstract link 450 created and once the bandwidth is reserved, the call flow and path computation process 500 for ENNI calls sees the bandwidth was reserved a-priori. The call flow and path computation process 500 begins with the routing controller RC2 or a Path Communication Element (PCE) getting a bandwidth reservation requirement for the link between the border nodes BN2, BN3 (step 502). The border node BN2 checks if link bandwidth is reserved using the dynamic TAG ID from the bandwidth reservation process 400 (step 504).

If the link bandwidth is not reserved (step 504), then the border node BN2 computes a path and the border node BN3 can use any of the links but it is not guaranteed that it will be able to find a path (step 506). The bandwidth is not guaranteed between the border nodes BN2, BN3 and thus the call can fail (step 508). If the link bandwidth is reserved (step 504), then the border node BN2 computes a path and BN3 uses only the links reserved using the dynamic TAG ID (step 510). For example, this can be the abstract link 450 created using the bandwidth reservation process 400. The bandwidth was guaranteed between the border nodes BN2, BN3 so the call will not fail (step 512).

Figure 6:
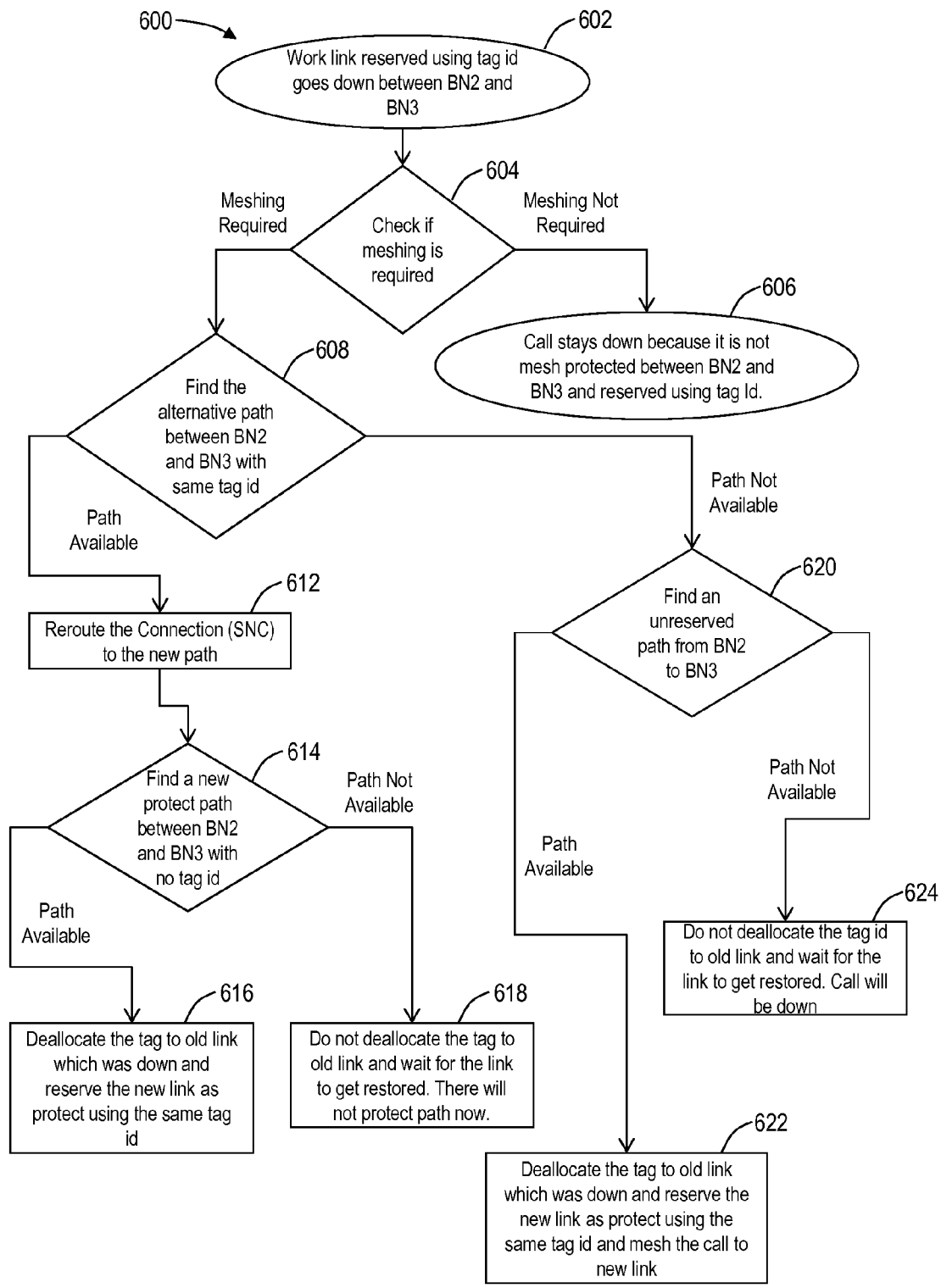
FIG. 6 is a flowchart of a protection switch process which continues from the bandwidth reservation process of FIG. 4 and the call flow and path computation process of FIG. 5 and references the network of FIG. 1 for illustration thereof.

Referring to FIG. 6, in an exemplary embodiment, a flowchart illustrates a protection switch process 600 which continues from the bandwidth reservation process 400 and the call flow and path computation process 500 and references the network 100 for illustration thereof. Continuing from the call flow and path computation process 500, in case a work link goes down and the service level of the connection requires mesh or switch to protect path, the local domain triggers a mesh/switch to protect path as per the protection switch process 600. The protection switch process 600 assumes the work link was reserved using the dynamic TAG ID and that the work link goes down between the border nodes BN2, BN3 (step 602). The protection switch process 600 checks if meshing is required (step 604). If meshing is not required (step 604), the call stays down because it is not mesh protected between the border nodes BN2, BN3 and reserved using the dynamic TAG ID (step 606).

If meshing is required (step 604), the protection switch process 600 finds an alternative path between the border nodes BN2, BN3 using the same dynamic TAG ID (step 608). If a path is available (step 608), the protection switch process 600 meshes the connection, e.g. a subnetwork connection (SNC), to the new path (step 612). Subsequently, the protection switch process 600 finds a new protect path between the border nodes BN2, BN3 with no dynamic TAG ID thereon (step 614). If a path is available (step 614), the protection switch process 600 deallocates the dynamic TAG ID from the old link which is down and reserves the new link on the available path as protect using the same dynamic TAG ID (step 616). If a path is not available (step 614), the protection switch process 600 does not deallocate the dynamic TAG ID from the old link and instead waits for the link to be restored (step 618). In this case, there is no protect path now.

If a path is not available (step 608), the protection switch process 600 finds an unreserved path between the border nodes BN2, BN3 (step 620). If a path is available (step 620), the protection switch process 600 deallocates the dynamic TAG ID from the old link which is down and reserves the new link as protect using the same dynamic TAG ID and meshes the call to the new link (step 622). If a path is not available (step 620), the protection switch process 600 does not deallocate the dynamic TAG ID of the old link and waits for the link to get restored (step 624). In this case, the call will be down until the link is restored.

Figure 7:
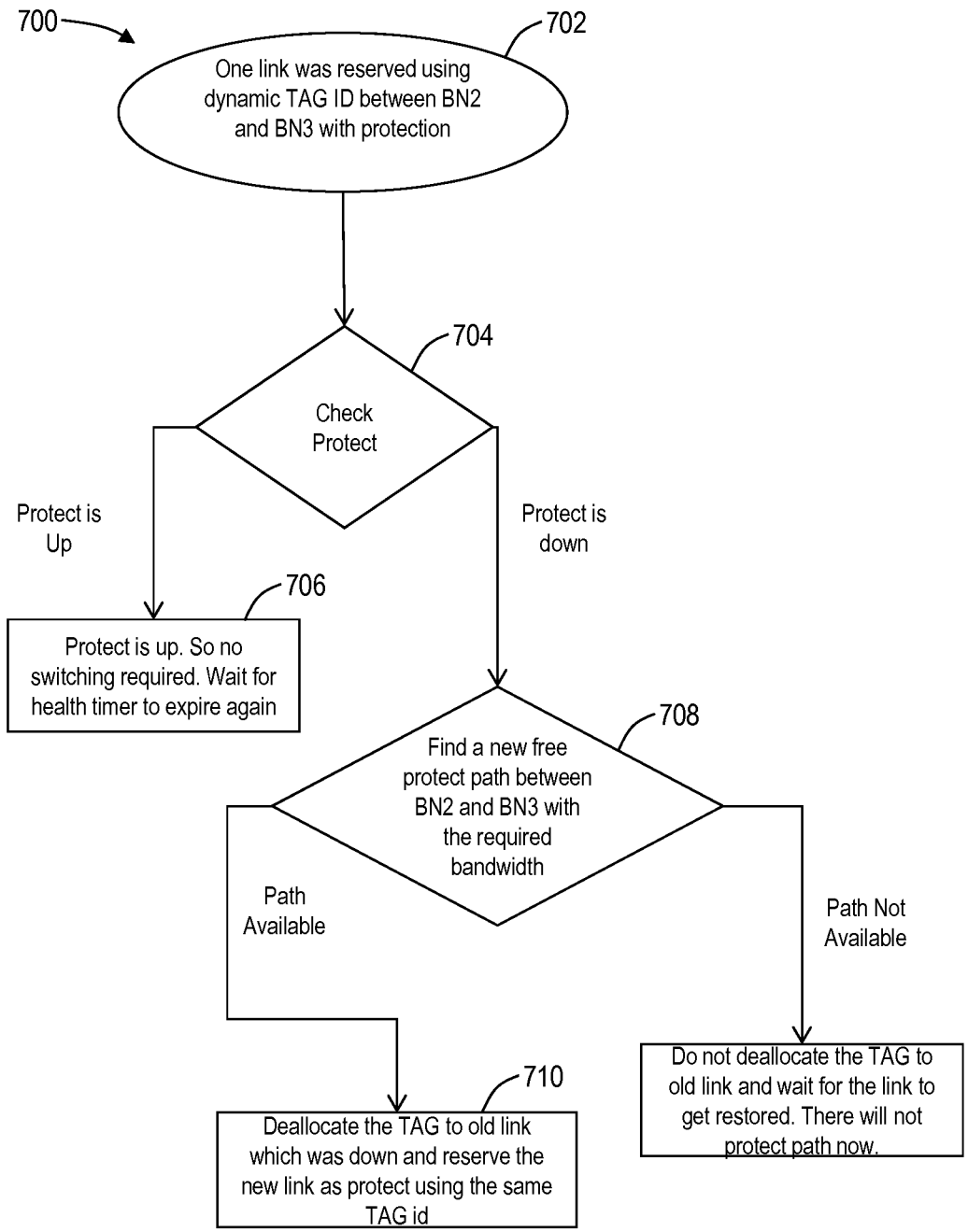
FIG. 7 is a flowchart of a periodic protect link health checkup process which continues from the bandwidth reservation process of FIG. 4, the call flow path computation process of FIG. 5, and the protection switch process of FIG. 6 and references the network of FIG. 1 for illustration thereof.

Referring to FIG. 7, in an exemplary embodiment, a flowchart illustrates a periodic protect link health checkup process 700 which continues from the bandwidth reservation process 400, the call flow path computation process 500, and the protection switch process 600 and references the network 100 for illustration thereof. In an exemplary embodiment, one of the routing controllers can use the periodic protect link health checkup process 700 to continue to monitor the protect path for each of the bandwidth reserved TAG IDs even though they may be idle. This is to provide robustness and a certain degree of reliability in ensuring protect path is always available. The periodic protect link health checkup process 700 can operate on a link reserved using the dynamic TAG ID such as one between the border nodes BN2, BN3 with protection (step 702). The periodic protect link health checkup process 700 checks the protect link (step 704).

If the protect link is up (step 704), the periodic protect link health checkup process 700 notes the protect is up and no switching is required and waits for a health timer to expire again (step 706). The health timer can be used to indicate the periodic protect link health checkup process 700 is needed to check a protect link. The health timer can include a default or user determined amount of time. If the protect link is down (step 704), the periodic protect link health checkup process 700 can find a new free protect path between the border nodes BN2, BN3 with the required bandwidth (step 708). If a path is available (step 708), the periodic protect link health checkup process 700 can deallocate the dynamic TAG ID from the old link which is down and reserve the new link as protect using the same dynamic TAG ID (step 710). If a path is not available (step 708), the periodic protect link health checkup process 700 does not deallocate the dynamic TAG ID from the old link, but waits for the link to get restored (step 712). In this case, there is no currently available protect link.

Figure 8:
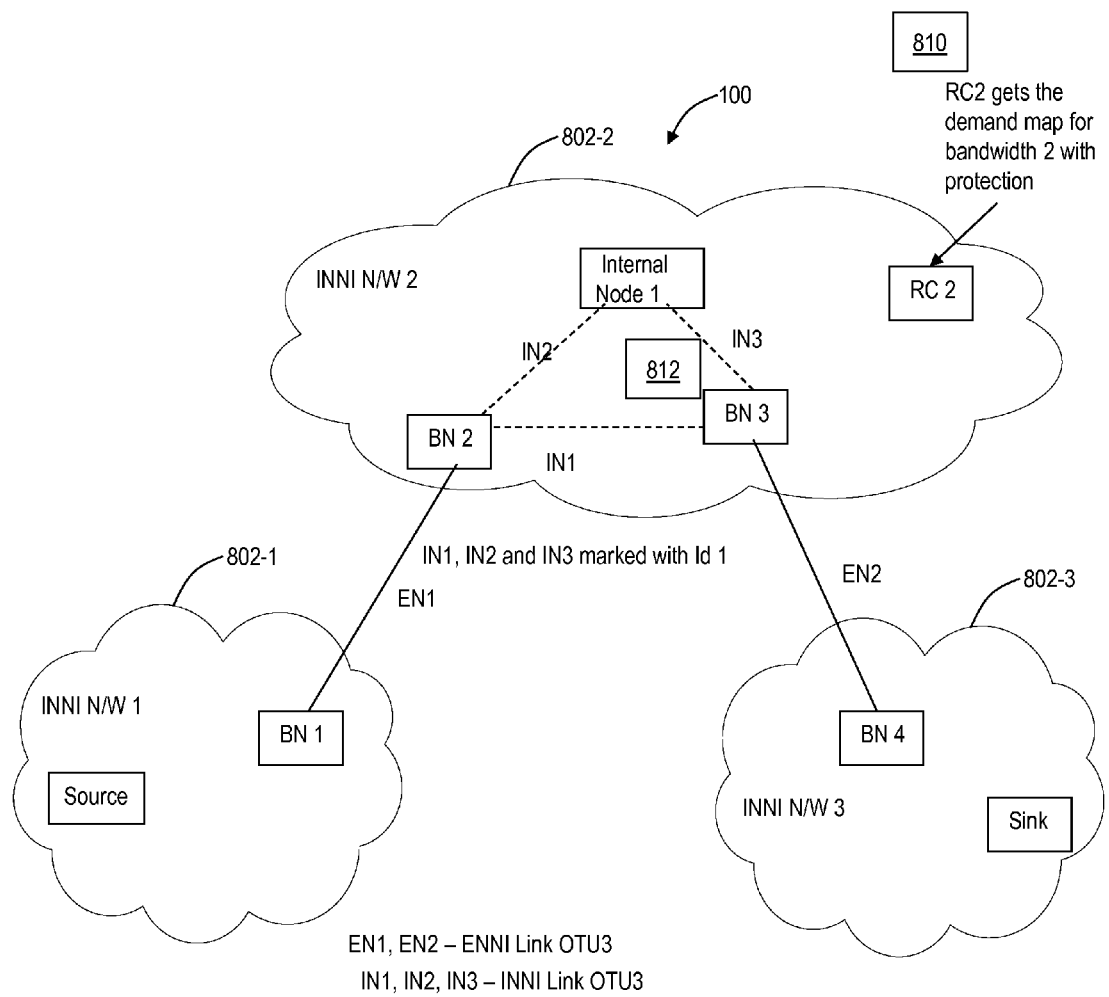
FIG. 8 is a network diagram of a network with three domains illustrating an exemplary operation of dynamic reservation of bandwidth such as in accordance with the processes of FIGS. 4-7.

Referring to FIG. 8, in an exemplary embodiment, a network diagram illustrates a network 800 with three domains 802-1, 802-2, 802-3 illustrating an exemplary operation of dynamic reservation of bandwidth such as in accordance with the processes 400, 500, 600, 700. As described herein, the dedicated reservation of bandwidth is for a particular service. That is, when using dynamic tagging for a particular link, dedicated resources are allocated for a specified service, thus providing extra reliability. This can be applied to Abstract link in ENNI. Using dynamic tagging, work and protect routes are reserved without actually creating a cross-connect. While advertising INNI links, normally individual link bandwidth is not advertised (unless the domain is configured for full-topology). In common practice, the abstract link is just advertised and bandwidth on it is not guaranteed. Using the dynamic reservation of bandwidth, the INNI links are reserved with the unique dynamic TAG IDs (unique to the domain), thus guaranteeing the availability of bandwidth for the abstract link and preventing the crank-back of calls from the domain, thereby improving reliability. This bandwidth reservation using dynamic link tagging is done at central server, such as a routing controller, which will take keep track of all the internal links.

In ENNI, the routing controller acts as a central server and abstract links are created only on the routing controller. So when the routing controller or the central server gets a demand map for a particular service, ENNI in this case, it marks the links with a dynamic TAG ID and these will be used only for that service. With reference to the network 800, a routing controller RC2 gets a demand map of a service, e.g. an Optical channel Data Unit-3 (ODU3), with protection between the border nodes BN2, BN3 (step 810). Assume protection is required, thus the routing controller RC2 needs to reserve twice the required bandwidth in the domain 802-2. The routing controller RC2 marks IN1, IN2, IN3 links with unique dynamic TAG ID (say 1) to reserve the links (step 812). Thus, 2*ODU3 bandwidth is reserved for abstract links between the border nodes BN2, BN3 and can be used only for the ENNI connections between the border nodes BN2, BN3 Links marked with the dynamic TAG ID 1 cannot be used for any other service.

Figure 9:
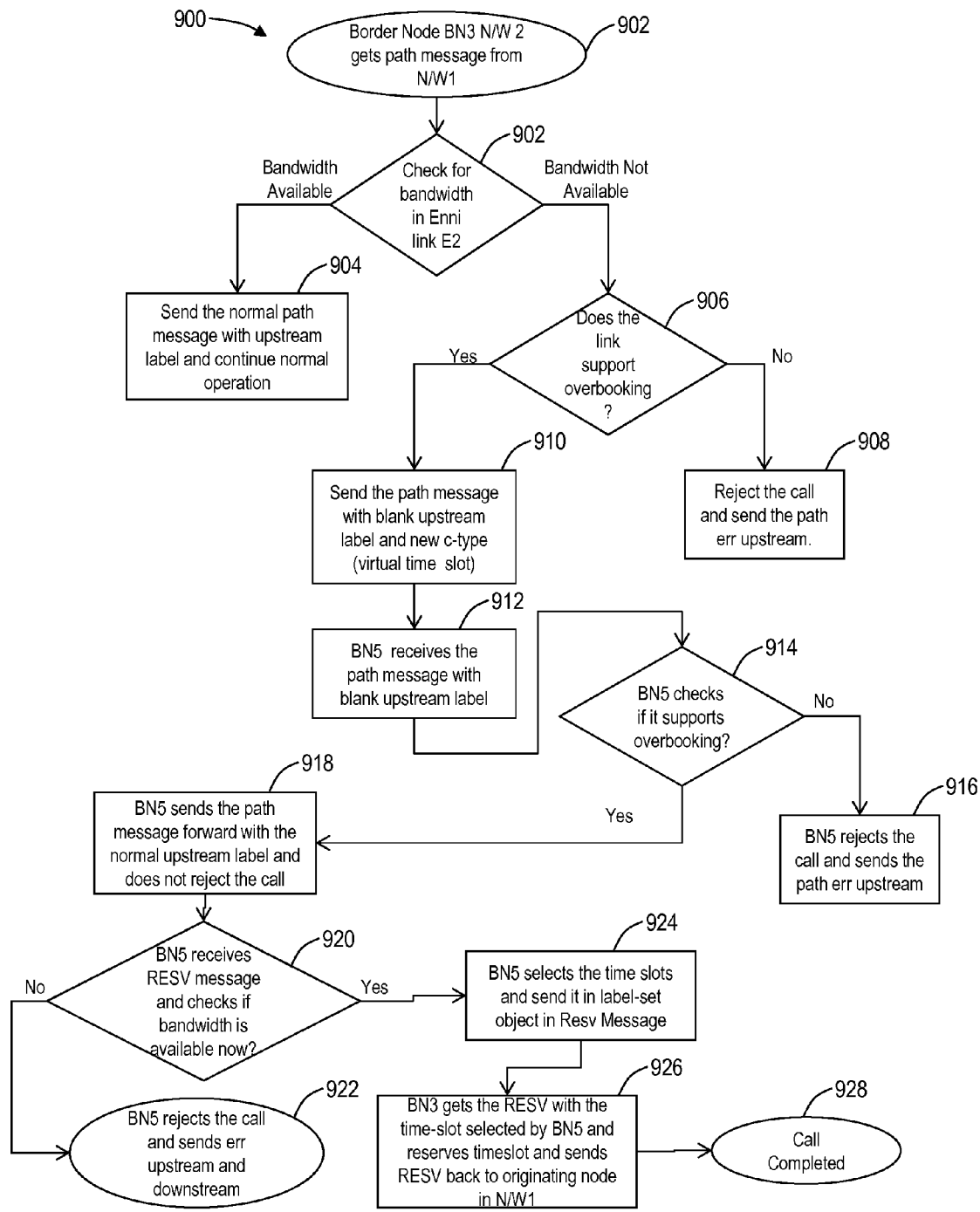
FIG. 9 is a flowchart of a call setup process using an overbooking greedy approach and referencing the network of FIG. 1 for illustration thereof.

Referring to FIG. 9, in an exemplary embodiment, a flowchart illustrates a call setup process 900 using an overbooking greedy approach and referencing the network 100 for illustration thereof. The call setup process 900 proposes a greedy approach for overbooking of the resources on an ENNI link which leads to effective utilization of resources on ENNI link. With overbooking, the call setup process 900 ensures that no call is failed until all the resources on the links are actually used in the connections. To support overbooking, two changes are required in the ITU-T standards such as for ASON. Both the upstream and downstream need to support overbooking to use this solution. First, the changes include, while advertising a link in an ASON network, the call setup process 900 adds a new capability which will tell if a node supports overbooking or not and what can be the extent of overbooking Extent of overbooking should not be more than 200% which means that one resource can be used in maximum of two calls.

Next, the changes include, when all the resources are exhausted on a link, the call setup process 900 sends a blank label in the upstream label. This can include a new connection type (ctype) for this so that downstream node does not discard the blank upstream label. The call setup process 900 uses the new ctype only on the links which support overbooking Tributary port number (TPN) and time slots will be allocated by downstream node in this overbooking scenario and will be sent in a RESV message. Currently if the blank label is supplied in the upstream object, a call gets rejected. So the new ctype is essential to support the overbooked calls.

The overbooking scenario comes into picture when on a transient node all the time-slots and TPNs are being used in some call but calls are still not completed, assume 32 calls are ongoing. A RESV message for any of the 32 calls has not been received and transient node gets one more call (a $33^{rd}$ call). Upon getting the $33^{rd}$ call, the call setup process 900 first checks whether the link supports overbooking or not. If link does not support overbooking, a path error is returned. If the link supports overbooking, the call setup process 900 sends the blank upstream label with the new ctype. Downstream nodes should not reject the blank upstream label as the link is advertised as overbooked link. Downstream nodes will forward the path message without allocating any resources and wait for the RESV message.

Now upon receiving the RESV message for the $33^{rd}$ call, there are several scenarios. First, if all the previous 32 calls succeed and the RESV message for the $33^{rd}$ call is received, since the bandwidth is booked, the $33^{rd}$ call will have to be torn down. Second, if some of the previous calls succeed, but the rest all still waiting for the RESV message, in this case, the $33^{rd}$ call is also torn down. Third, if some of the calls fail before the downstream node gets the RESV message of the $33^{rd}$ call, there is bandwidth available on the link to support the $33^{rd}$ call. The downstream node will select the available TPN and timeslot and send this information in a label set object in a RESV message and reserve the resource and make connection. When the upstream node received the RESV message, it extracts time-slot and TPN information and completes the call. The upstream node is bound to use the label selected by downstream node in the overbooking.

FIG. 9 illustrates an example of a call flow for the call setup process 900 from the domain 102-1 to the domain 102-3 via the domain 102-2. The call setup process 900 includes the border node BN2 getting a PATH message from the domain 102-1 (step 902). If bandwidth is available (step 902), the call setup process 900 includes sending a normal path message with an upstream label and continuing normal operation (step 904). In this case, overbooking is not needed since bandwidth is available. If bandwidth is not available (step 902), the call setup process 900 checks if the link supports overbooking (step 906). If overbooking is not supported (step 906), the call setup process 900 rejects the call and sends a PATH ERR message upstream (step 908).

If overbooking is supported (step 906), the call setup process 900 sends a path message with a blank upstream label and a new ctype for a virtual time slot (step 910). The border node BN5 receives the path message with the blank upstream label (step 912). The border node BN5 checks if it supports overbooking (step 914). If the border node BN5 does not support overbooking (step 914), then the border node BN5 rejects the call and sends a PATH ERR message upstream (step 916). If the border node BN5 supports overbooking (step 914), then the border node BN5 sends a path message forward with the normal upstream label and does not reject the call (step 918). The border node BN5 receives a RESV message and checks if bandwidth is now available (step 920).

If bandwidth is not available (step 920), the border node BN5 rejects the call and sends a PATH ERR message upstream and PATH TEAR downstream (step 922). If bandwidth is available (step 920), the border node BN5 selects the time slots and sends it in a label-set object in a RESV message (step 924). The border node BN3 gets the RESV message with the time-slot selected by the border node BN5 and reserves timeslots and sends a RESV message back to the originating node in the domain 102-1 (step 926). The call is completed (step 928).

Figure 10:
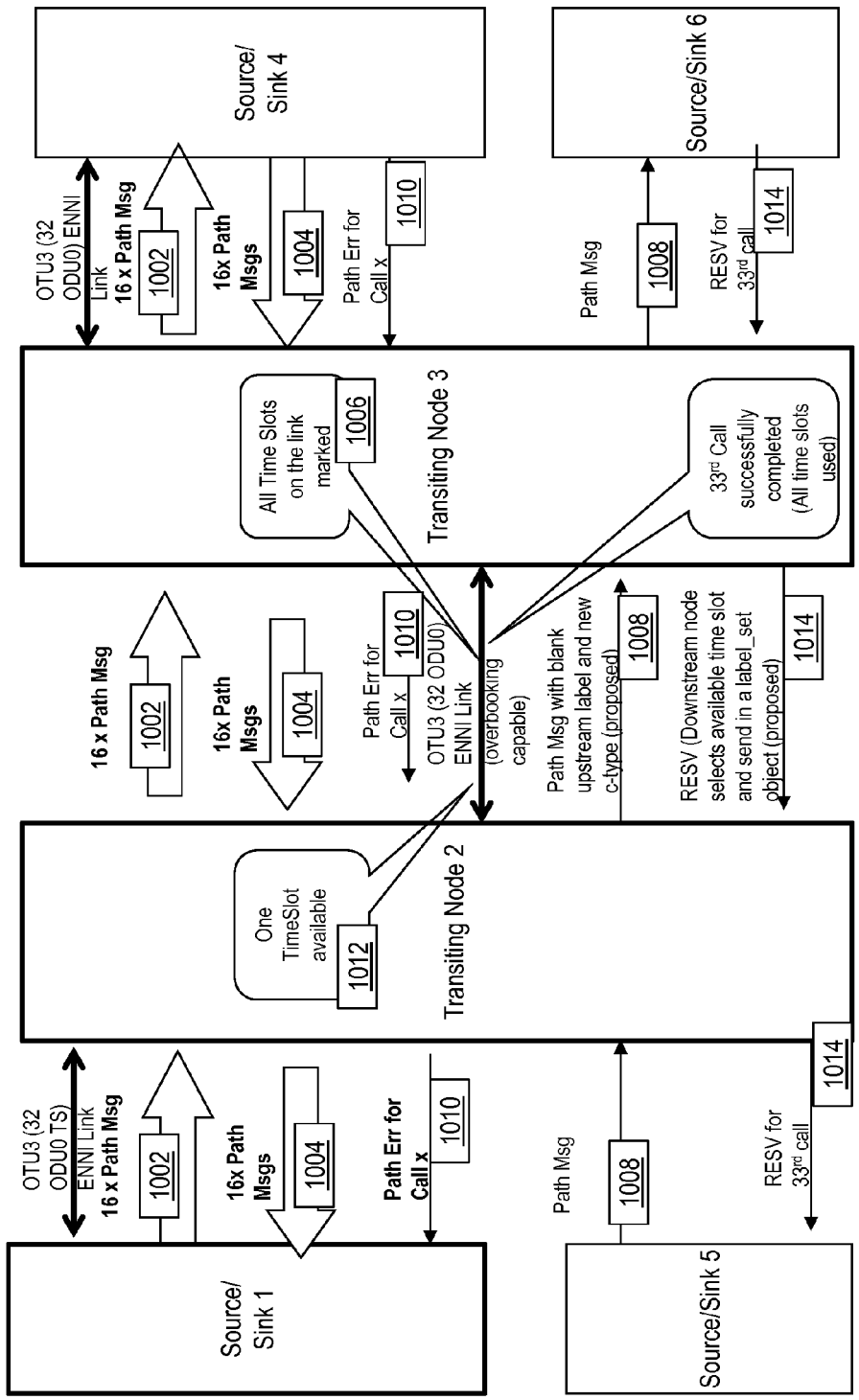
FIG. 10 is a flow diagram of an exemplary operation of the call setup process of FIG. 9 between various nodes.

Referring to FIG. 10, in an exemplary embodiment, a flow diagram illustrates an exemplary operation of the call setup process 900 between various nodes. The nodes include a source/sink 1, a transiting node 2, a transiting node 3, a source/sink 4, source/sink 5, and source/sink 6. The source/sink 1 has an Optical channel Transport Unit-3 (OTU3) connection via an ENNI link to the transiting node 2, the transiting node 2 has an OTU3 connection to the transiting node 3 via an ENNI link, and the transiting node 3 has an OTU3 connection to the source/sink 4. The OTU3 connections each have 32 ODU0 timeslots (TS). At a first step 1002, the source/sink 1 sends 16 PATH messages to the source/sink 4 through the transiting nodes 2, 3. At a second step 1004, the source/sink 4 sends 16 PATH message to the source/sink 1 through the transiting nodes 2, 3. Each of the PATH messages is for an ODU0. At a step 1006, all timeslots are marked on the ENNI link between the transiting nodes 2, 3.

At a step 1008, the source/sink 5 sends a PATH message to the source/sink 6 through the transiting nodes 2, 3. This is for an ODU0, i.e. a so-called $33^{rd}$ ODU0. Since the ENNI link between the transiting nodes 2, 3 is full, but configured for overbooking, the transiting node 2 sends a PATH message with a blank upstream label and the new ctype to the transiting node 3. At a step 1010, a PATH ERR message is sent from the source/sink 4 to the source/sink 1 through the transiting nodes 2, 3. For example, the PATH ERR message can be that one of the connections, e.g. connection x, failed. There is now one timeslot available at step 1012. At a step 1014, a RESV message is sent from the source/sink 6 to the source/sink 5 through the transiting nodes 2, 3. Due to the overbooking between the transiting nodes 2, 3 and the failure of the connection X, the $33^{rd}$ ODU0 can be supported between the source/sink 5 and the source/sink 6 through the transiting nodes 2, 3.

Figure 11:
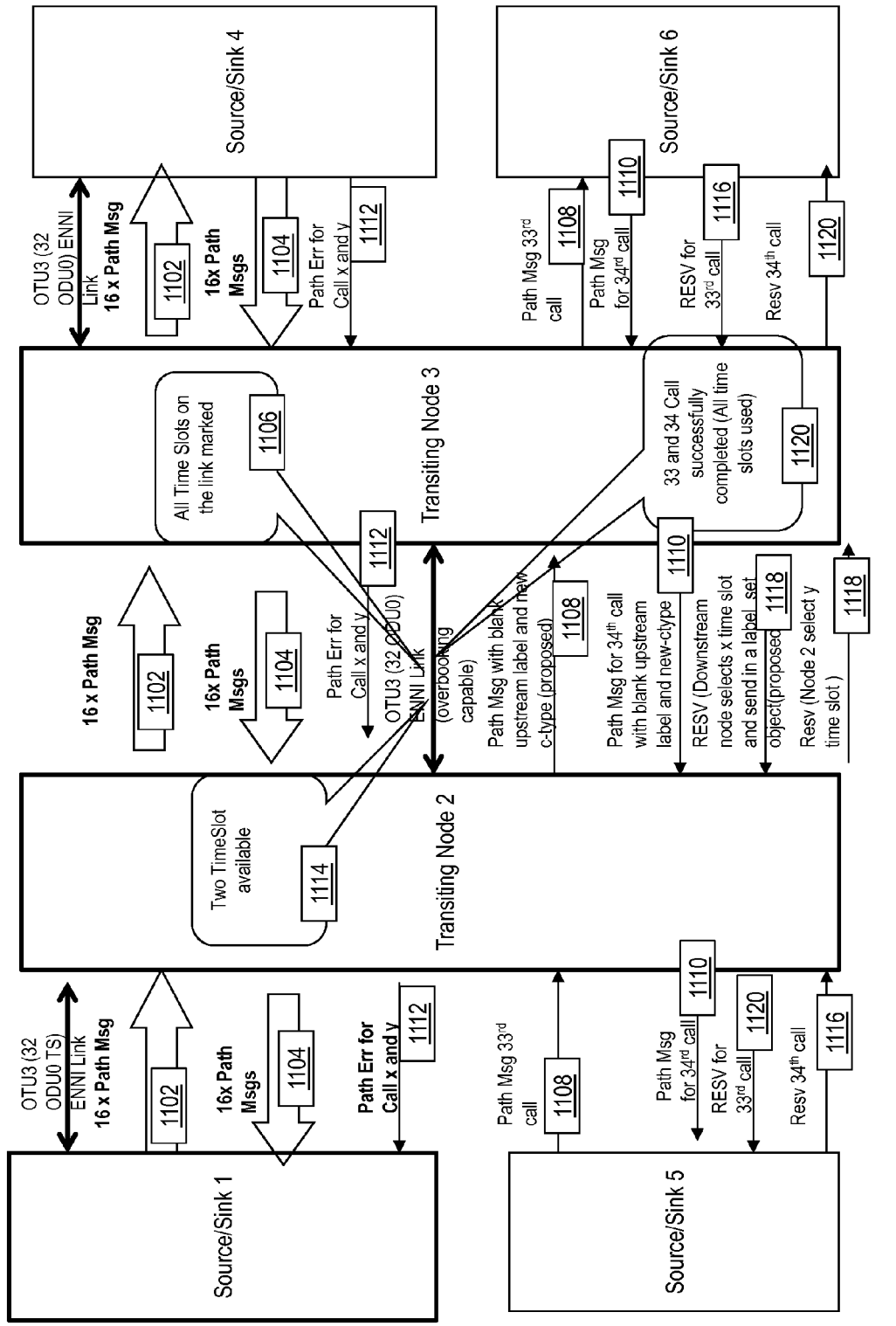
FIG. 11 is a flow diagram of an exemplary operation of the call setup process of FIG. 9 for bidirectional calls between various nodes.

Referring to 11, in an exemplary embodiment, a flow diagram exemplary operation of the call setup process 900 for bidirectional calls between various nodes. FIG. 11 is similar to FIG. 10 but illustrates a $34^{th}$ call in addition to a $33^{rd}$ call. Suppose the bandwidth of the link between the transiting nodes 2, 3 is exhausted as RESV messages for any of the 32 calls have not been received and transient node gets two more calls from two different direction (i.e., $33^{rd}$ and $34^{th}$ calls). Now before RESV messages are received for the $33^{rd}$ and $34^{th}$ call, two timeslots and TPN get freed. Now when RESV messages for $33^{rd}$ and $34^{th}$ call come, two nodes on that transient link can allocate the same resource to both the calls which will result in failure of both the calls. To solve, sequential and de-sequential allocation of resources can be used. One node on the link will allocate the resources from the top and other from the bottom so that this glare condition is avoided.

At a first step 1102, the source/sink 1 sends 16 PATH messages to the source/sink 4 through the transiting nodes 2, 3. At a second step 1104, the source/sink 4 sends 16 PATH message to the source/sink 1 through the transiting nodes 2, 3. Each of the PATH messages is for an ODU0. At a step 1106, all timeslots are marked on the ENNI link between the transiting nodes 2, 3. At a step 1108, the source/sink 5 sends a PATH message to the source/sink 6 through the transiting nodes 2, 3. This is for an ODU0, i.e. a so-called $33^{rd}$ ODU0. Since the ENNI link between the transiting nodes 2, 3 is full, but configured for overbooking, the transiting node 2 sends a PATH message with a blank upstream label and the new ctype to the transiting node 3.

At a step 1110, the source/sink 6 sends a PATH message to the source/sink 5 through the transiting nodes 2, 3. This is for an ODU0, i.e. a so-called $34^{th}$ ODU0. Since the ENNI link between the transiting nodes 2, 3 is full, but configured for overbooking, the transiting node 3 sends a PATH message with a blank upstream label and the new ctype to the transiting node 2 for the $34^{th}$ ODU. At a step 1112, the source/sink 4 sends a PATH ERR message to the source/sink 1 for two calls, x and y. At a step 1114, there is now two time slots available between the transiting nodes 2, 3. At a step 1116, the source/sink 5 sends a RESV message for the $34^{th}$ call to the source/sink 6 and the source/sink 6 sends a RESV message for the $33^{rd}$ call to the source/sink 5. At a step 1118, the transiting node 3 sends the RESV message for the $33^{rd}$ call to the downstream node and selects the x time slot and sends in a label set object. Also at the step 1118, the transiting node 2 sends the RESV message for the $34^{th}$ call to the downstream node selecting the y time slot. Finally, at a step 1120, the RESV messages reach the source/sink 5 and the source/sink 6 and the calls are setup successfully.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A call setup method in a multi-domain network, comprising:
   receiving, at a routing controller or a central server, an abstract link configuration request between two border nodes in a domain of the multi-domain network with a plurality of associated parameters;
   determining a path for an abstract link in the domain based on the abstract link configuration request;
   generating a unique tag identifier, through a routing controller, for the determined path;
   flooding the determined path in the domain with the associated unique tag identifier to reserve Optical Channel Data Unit (ODU) bandwidth between the two border nodes for the call setup;
   creating the abstract link on the determined path such that the determined path is reserved based on the plurality of parameters; and
   operating an external network-network interface (ENNI) link connected to one of the two border nodes in an overbooked manner such that no call is failed until all of the resources on the ENNI link are actually used, wherein the operating comprises
      responsive to a path message requesting bandwidth on the ENNI link and responsive to bandwidth being unavailable on the ENNI link for the path message, sending the path message with a blank upstream label and a new connection type so downstream nodes do not discard the blank upstream label,
      responsive to a reservation (RESV) message for the requested bandwidth, checking again if bandwidth is available on the ENNI link, and
      if bandwidth is available when the RESV message is sent, selecting the available bandwidth for the RESV message.

2. The call setup method of claim 1, further comprising:
   tracking the abstract link at the routing controller or the central server.

3. The call setup method of claim 1, further comprising:
   determining the path for the abstract link in the domain based on the abstract link configuration request as either an explicit link or an implicit link;
   for the explicit link, determining the path based on an explicit list of nodes in the domain; and
   for the implicit link, computing the path based on the plurality of parameters.

4. The call setup method of claim 1, further comprising:
   receiving a bandwidth reservation requirement between the two border nodes; and
   if the bandwidth reservation requirement comprises link bandwidth reserved on the determined path, computing a path for the bandwidth reservation requirement using only links reserved with the unique tag identifier.

5. The call setup method of claim 1, wherein the path comprises a working path, and further comprising:
determining a protect path for the abstract link in the domain based on the abstract link configuration request as either an explicit link or an implicit link;
flooding the determined protect path in the domain with the associated unique tag identifier; and
creating the abstract link on the determined protect path such that the determined protect path is reserved based on the plurality of parameters.

6. The call setup method of claim 5, further comprising:
responsive to the working path being down, restoring the working path to the determined path using the same associated unique tag identifier;
finding a new protect path between the two border nodes; and
responsive to finding the new protect path, deallocating the unique tag identifier from the working path and assigning the unique tag identifier to the new protect path.

7. The call setup method of claim 5, further comprising:
periodically checking the determined protect path;
if the determined protect path is down, finding a new protect path between the two border nodes; and
responsive to finding the new protect path, deallocating the unique tag identifier from the determined protect path and assigning the unique tag identifier to the new protect path.

8. The call setup method of claim 1, wherein the overbooked manner is operated within Automatically Switched Optical Network (ASON) as defined in G.8080/Y.1304.

9. A call setup method in a multi-domain network, comprising:
operating an external network-network interface (ENNI) link connected to a border node in the multi-domain network in an overbooked manner such that no call for Optical Channel Data Unit (ODU) bandwidth is failed in a control plane until all of the resources on the ENNI link are actually used in the multi-domain network;
receiving a plurality of path requests over the ENNI link;
determining the ODU bandwidth is not available for one or more of the plurality of path requests;
for each of the one or more of the plurality of path requests, sending the path requests with a blank upstream label and a virtual time slot denoted by a new connection type (ctype) so downstream nodes do not discard the blank upstream label; and
upon receiving a reservation (RESV) message for each of the one or more of the plurality of path requests, checking again if the ODU bandwidth is available on the ENNI link and if so, selecting the available bandwidth for the RESV message.

10. The call setup method of claim 9, wherein the overbooked manner is operated within Automatically Switched Optical Network (ASON) as defined in G.8080/Y.1304.

11. The call setup method of claim 10, wherein the sending the path requests comprises using a new connection type (ctype) in ASON indicative of an overbooked call.

12. The call setup method of claim 10, wherein the sending the path requests ensures calls for the one or more of the plurality of path requests are failed only when the bandwidth on the ENNI link is actually in use as opposed to reserved.

13. The call setup method of claim 9, further comprising:
receiving, at a routing controller or a central server, an abstract link configuration request between the border node and another border node in a domain of the multi-domain network with a plurality of associated parameters;
determining a path for an abstract link in the domain based on the abstract link configuration request;
generating a unique tag identifier for the determined path;
flooding the determined path in the domain with the associated unique tag identifier; and
creating the abstract link on the determined path such that the determined path is reserved based on the plurality of parameters.

14. The call setup method of claim 13, further comprising:
determining the path for the abstract link in the domain based on the abstract link configuration request as either an explicit link or an implicit link;
for the explicit link, determining the path based on an explicit list of nodes in the domain; and
for the implicit link, computing the path based on the plurality of parameters.

15. The call setup method of claim 13, further comprising:
receiving a bandwidth reservation requirement between the border node and the another border node; and
if the bandwidth reservation requirement comprises link bandwidth reserved on the determined path, computing a path for the bandwidth reservation requirement using only links reserved with the unique tag identifier.

16. The call setup method of claim 13, further comprising:
determining a protect path for the abstract link in the domain based on the abstract link configuration request as either an explicit link or an implicit link
flooding the determined protect path in the domain with the associated unique tag identifier; and
creating the abstract link on the determined protect path such that the determined protect path is reserved based on the plurality of parameters.

17. The call setup method of claim 16, further comprising:
responsive to a working path being down, restoring the working path to the determined path using the same associated unique tag identifier;
finding a new protect path between the two border nodes; and
responsive to finding the new protect path, deallocating the unique tag identifier from the working path and assigning the unique tag identifier to the new protect path.

18. A multi-domain network, comprising:
a plurality of domains each comprising a plurality of interconnected network elements;
a first border node connecting two domains of the plurality of domains via an external network-network interface (ENNI) link; and
a routing controller in one of the two domains;
wherein the ENNI link is configured to operate in an overbooked manner such that no call for Optical Channel Data Unit (ODU) bandwidth is failed in a control plane until all of the resources on the ENNI link are actually used in the two domains, and wherein the routing controller is configured to dynamically reserve ODU bandwidth in one of the plurality of domains via an abstract link with a dynamic tag, wherein the routing controller is configured to generate the dynamic tag,
wherein, for the overbooked manner, the first border node is configured to
responsive to a path message requesting bandwidth on the ENNI link and responsive to bandwidth being unavailable on the ENNI link for the path message, send the path message with a blank upstream label and a new connection type so downstream nodes do not discard the blank upstream label, responsive to a reservation (RESV) message for the requested bandwidth, check again if bandwidth is available on the ENNI link, and if bandwidth is available when the RESV message is sent, select the available bandwidth for the RESV message.

19. The multi-domain network of claim 18, wherein the first border node is configured to simultaneously set up calls between the two domains, with the overbooked manner allowing set up of more capacity than is available on the ENNI link in a control plane and associated calls are failed and cranked back only if all of the resources on the ENNI link are actually used.

20. The multi-domain network of claim 18, wherein each of the two domains operates a separate control plane interconnected by the ENNI link, wherein the dynamic tag is configured to reserve bandwidth on the ENNI link in the control plane without creating cross-connects in the first border node.

21. The multi-domain network of claim 18, wherein each of the two domains operates a control plane, which is Automatically Switched Optical Network (ASON) as defined in G.8080/Y.1304, and wherein the dynamic tag and the overbooked manner is operated in ASON.

* * * * *